United States Patent Office 3,730,869
Patented May 1, 1973

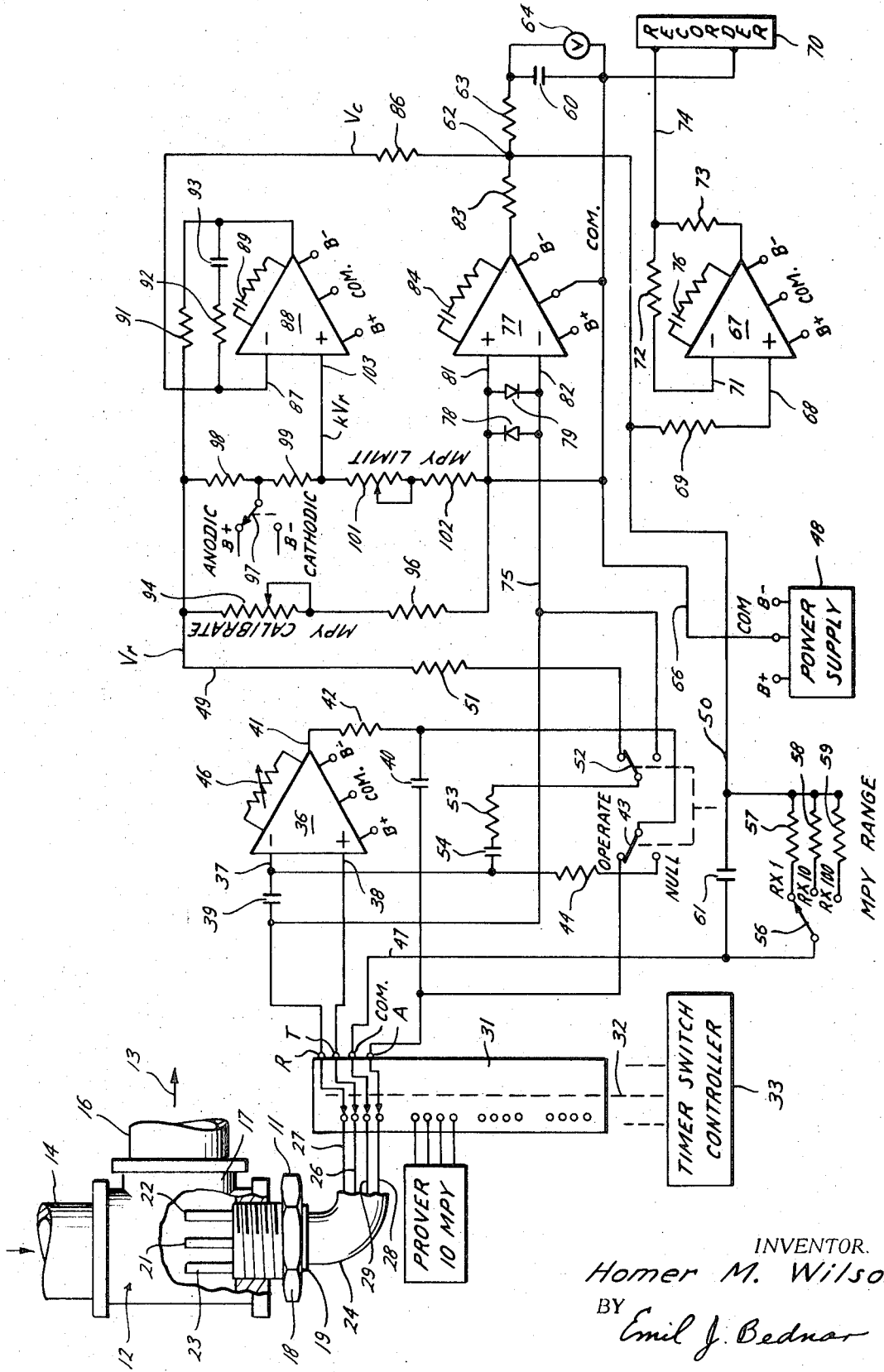

3,730,869
CORROSION RATEMETER
Homer M. Wilson, Houston, Tex., assignor to Petrolite Corporation, St. Louis, Mo.
Filed Feb. 16, 1971, Ser. No. 115,368
The portion of the term of the patent subsequent to Oct. 26, 1988, has been disclaimed
Int. Cl. G01n 27/46
U.S. Cl. 204—195 C
14 Claims

ABSTRACT OF THE DISCLOSURE

A corrosion ratemeter with test (specimen), reference and third electrodes contactable by a corrodent. An input circuit connects the test and reference electrodes to an isolation amplifier. The amplifier provides in its output circuit an output current signal representative of the potential difference between the test and reference electrodes. A capacitance means in series with the input circuit is charged to the freely corroding potential representative of the potential difference between the test and reference electrodes during "null" operation. As a result, the input circuit applies a zero potential input signal to the isolation amplifier. A reference voltage signal is applied to the input circuit of the amplifier during "operate" conditions. The amplifier now provides, in its output circuit between the third and test electrodes, an output current signal of sufficient magnitude that the test electrode is polarized by a certain polarization potential (e.g., 10 millivolts). Readout means connected to the isolation amplifier measure the output current signal representative of this polarization potential, which output current signal is representative of the corrosion rate occurring at the test electrode. Voltage limiter means can provide the reference voltage signal to control the rate of change and magnitude of the output current signal.

BACKGROUND OF THE INVENTION (1) Field of the invention

This invention relates to measuring and testing corrosion processes and it relates particularly to the instruments and electrochemical techniques used in the study of corrosion processes.

(2) Description of the prior art

It is often desirable to determine the rates at which metals corrode within a corrodent such as a corrosive liquid. For example, corrosion inhibitors are added to aqueous liquids to reduce the corrosion of exposed metals. Instruments are used to measure the rate at which these metals corrode so that the effectiveness of the inhibitor can be determined. The measure of the rate of corrosion upon metals usually involves an instrument associated with a probe carrying electrodes immersed within the corrodent. These instruments are usually termed "corrosion ratemeters." The electrodes in the corrodent undergo certain electro-chemical changes that are related to the corrosion of the specimen forming the test electrode. The rate of corrosion can be correlated with the electro-chemical effects upon the test (specimen) electrode contacted by the corrodent.

The corrosion of metallic materials by a corrodent causes the dissipation of electrical energy by electro-chemical action. For example, two metallic electrodes immersed in a corrodent develop a potential difference as a result of half-cell effects. The potential at a freely corroding test electrode (no external current application) in a dynamic system where the corrosion products are either diffusing or dissolving, eventually reaches a relatively steady-state potential differential relative to a reference electrode. This potential difference may be termed the "freely corroding potential" of the test electrode forming the half-cell subjected to the corrodent. A test electrode, which is subject to corrosion, may be polarized into a non-corroding state by passing direct current from an external source between the electrode and corrodent. The amount of current-induced change in the electrical potential of the test electrode, with respect to a reference electrode, is termed as "polarizing potential." The polarizing potential may be anodic or cathodic, depending upon the directional flow of current which produces the polarization potential. Correlation of the polarization potential increments against the applied current increments may be used to determine the rate of corrosion of the test electrode subject to corrosion action.

An electro-chemical process and apparatus, especially useful in measuring corrosion rates, is described in U.S. Pat. 3,406,101. In this patent, there is described a corrosion ratemeter which includes a probe having three electrodes adapted to be exposed to a corrodent such as a corrosive liquid, an adjustable current source, an ammeter and a high impedance voltmeter as primary components. The adjustable current source applies a small electric current between a "test" electrode and an "auxiliary" or third electrode. At the same time, the voltmeter monitors the polarization potential produced by current flow between the test electrode and a reference electrode. The current flow slightly polarizes the surface of the test electrode, and as a result, causes a shift in potential (polarization potential) between the test and reference electrodes. The current flow required to produce a certain desired polarization potential (usually about 10 millivolts) is directly proportional to the corrosion rate of the test electrode undergoing corrosion. Usually, the polarization is selected within the linear voltage corrosion rate environmental conditions, and good results have been obtained with between 5 and 20 millivolts but preferably 10 millivolts, polarization.

If the corrosion rate is low, a very small current flow will polarize the test electrode. If the corrosion rate is high, more current flow is required to polarize the test electrode. The weight loss of metal lost from the test electrode (by electro-chemical corrosion) is directly proportional to the current flow in accordance with Faraday's Law. Thus, by use of appropriate constants and adjustments of the surface area of the test electrode, the ammeter can be calibrated directly into any desired units of corrosion rate providing the surface area of the test electrode exposed to corrosion can be adjusted to the desired range. In order to provide symmetry of the probe, and for other reasons, the exposed surface area of all electrodes is usually made identical. Thus, if the electrodes are constructed identically of the same material, such as 10–20 mild steel, any of the electrodes may serve as the auxiliary, test and reference functions in the electro-chemical techniques for determining the rate of corrosion.

In corrosion ratemeters of the type described in the mentioned patent, the amount of current which flows between the test and third electrodes to produce a certain polarization potential is measured to determine the rate of corrosion occurring at the test electrode. Any potential differences, such as the freely corroding potential, present between the test and reference electrodes, other than the polarizing potential, produce erroneous results in corrosion rate determinations. Obviously, these instruments can produce highly accurate results when a correction is made for the non-polarizing potential differences between these electrodes, principally the freely corroding potential, which may exist between these electrodes before, and also during, application of the polarizing current. Additionally, in these instruments correction for the freely corroding and other potentials must be made without affecting the impedance between the reference and test electrodes immersed within the corrodent. Otherwise, a constant polarizing current will produce corresponding variations in polarization potential to be developed between these electrodes.

Corrosion ratemeters employing controlled current flow for producing a certain polarization potential between electrodes, may employ a manual adjustment to remove the freely corroding potential component from the total difference between the test and reference electrodes. As a result, only the polarization potential will be the measure of when the controlled current is at the exact magnitude to provide a correct measurement of corrosion rate occuring at the test electrode, However, rather significant changes in the magnitude of the freely corroding potential, and also the impedance between the reference and test specimen electrodes, can occur over a short time interval during such manual adjustment. Then, the ultimate accuracy of the measurement of corrosion rate with these instruments can not be obtained in rapidly changing environments. Additionally, manual adjustments must be made for each set of electrodes with which the instrument is employed, and at closely spaced time intervals so that most accurate results in measurement of corrosion can be obtained.

The required correction for the freely corroding potential in the controlled current type of corrosion ratemeters becomes a serious obstacle when switching devices are employed so that a single corrosion ratemeter monitors a plurality of widely spaced apart probes, each probe carrying test, reference and third electrodes. For example, consider the problem in monitoring the corrosion occurring at 10 probes in various aqueous streams in a refinery or chemical plant at a distance of a mile from the corrosition ratemeter. Each probe is connected sequentially to the corrosion ratemeter. However, each monitored probe requires a correction in the corrosion ratemeter to compensate for the freely corroding potential at the test electrode. Then, the desired accurate measurement is made by adjusting current flow until a certain polarization occurs at the electrodes. Performing cathodic and anodic measurement of corrosion rate at each probe immediately doubles the number of operational steps required with the manually adjusted instrument. Therefore, an automatic system is desired to perform the necessary correction for the freely corroding potential.

The corrosion ratemeter can employ suitable circuitry to provide automatically an equal but opposing potential for removing the freely corroding potential from the circuit including the test and reference electrodes. The freely corroding potential is usually less than 100 millivolts and frequently is about the same magnitude as the certain polarization potential (generally 10 millivolts) to be established by controlled current between these electrodes. Thus, the input potential correcting circuitry is required to sense and then automatically remove a potential of a very small magnitude from substantially the same magnitude of the certain polarization potential to be established between these electrodes. The resistance of the conductors interconnecting each probe with the corrosion ratemeter becomes significant at distances of 1000 feet or more. Resistance in these conductors produces an IR potential in the conductor connected to the test electrode that is summed with the freely corroding potential at the electrodes and should be removed by the same correction circuitry. However, this resistance-induced potential is a function of the polarizing current passing through the conductor to the test electrode. As a result, the resistance-induced potential varies with current magnitude. Therefore, non-correctable errors can be introduced into the measurement of corrosion rate.

An automatic correcting type of corrosion ratemeter using the controlled current mode of operation is of great advantage. Circuitry is required during "null" condition to compensate for the freely corroding potential which exist as the potential difference between the reference and test electrodes in a freely corroding state when no external current flows between the electrodes. During the "operate" condition of such corrosion ratemeter, the circuitry must provide a reference signal which produces a current flow between the third and test electrodes. This current must be of such a magnitude that a certain polarization potential (5-25 mv.) is produced between the test and reference electrodes in addition to the freely corroding potential. Additionally, a readout means must measure the output current creating this polarization potential which current magnitude is representative of the corrosion rate occuring at the test electrode.

Various circuits may be envisioned for an automatic correcting type of corrosion ratemeter which can perform the above functions in the proper sequence and with the necessary accuracy of measurement. In one such circuit, the reference signal was introduced directly to the input of the amplifier connected to the reference and test electrodes and resulted in a great change in input impedance or resistance. As a result, the output signal from this amplifier did not maintain a predetermined relationship to the certain polarization potential in "operate" condition, obviously any resistance variations in the input circuit to the amplifier will cause the amplifier to receive an error signal in the input circuit besides the desired components representing the freely corroding potential and certain polarization potential. However, circuitry where the reference signal is applied to the input of the amplifier connected to the electrodes is of considerable advantage providing the undesired impedance changes within the input circuit could be overcome.

The above deficiency led to the development of the corrosion ratemeter of the present invention. Therefore, it is the purpose of the present invention to provide an automatic corrosion ratemeter which fulfills the need for an automatic "nulling" and "operating" instrument and applies the reference signal for creating the certain polarization potential, in the input circuit of the amplifier connected to the electrodes without effecting the ultimate impedance of the input circuit. In particular, the present corrosion ratemeter accurately and automatically corrects for the freely corroding potential, and then applies a reference signal to calibrate the input circuit for the certain polarization potential which is desired to be established between the reference and test electrodes during corrosion rate determinations.

SUMMARY OF THE INVENTION

In accordance with one aspect of this invention, there is provided a corrosion ratemeter for determining the rate of corrosion by means of polarization measurements in a corrodent. The meter employs a plurality of electrodes adapted to be placed into contact with the corrodent, one electrode being the test specimen. At least two electrodes, one being the test specimen, are connected in an input circuit to an isolation amplifier which produces, in its output circuit, an output current signal representative of the potential difference between these electrodes. The input circuit contains capacitance means which are charged to the freely corroding potential representative of the potential difference between at least two electrodes connected to the input circuit. A reference voltage signal is applied to the input circuit of the amplifier whereby the amplifier provides in its output circuit an output current signal representative of a certain polarization potential. The output current signal flows between the test and one other electrode to create this polarization potential at the test electrode. Readout means connected to the amplifier measure the output current signal representative of this polarization potential between the test and the other electrodes.

In accordance with another aspect of the invention, switching means may provide for the automatic null and operate conditions in the present corrosion ratemeter. In addition, a voltage limiter means may control the reference voltage signal application so that the rate of change and ultimate magnitude of the output current signal is of a magnitude no greater than the current handling capabilities of the isolation amplifier. Furthermore, the reference voltage signal may be applied through an RC network to provide a time constant function so that sudden film-disruptive current flows at the test electrode are avoided.

BRIEF DESCRIPTION OF THE DRAWING

The figure in the drawing includes a perspective view of an illustrative piping system with a corrosion ratemeter probe carrying a plurality of metallic electrodes interconnected by a cable to a switching assembly on which a "Meter Prover" is also connected; and the switching assembly is interconnected to one embodiment of a corrosion ratemeter of this invention which is shown in a schematic diagram.

DESCRIPTION OF SPECIFIC EMBODIMENTS

Referring now to the drawing, there is illustrated a probe 11 contained in a piping system 12 which conveys a corrodent, such as an aqueous fluid, in the direction indicated by the arrow 13. The piping system 12 includes a pair of pipes 14 and 16 interconnected by a T 17 to which the probe 11 is threadedly connected. The probe 11 may be constructed of any suitable form, such as the structure illustrated in U.S. 3,406,101. As illustrated, the probe 11 has a metallic body formed of pipe plug 18 carrying on insulated electrodes 21, 22, and 23 electrically isolated from the body. The electrodes are connected by conductors (not shown) within the plug 18 to an electrical connector 19. A cable 24 connects at one end to the connector 19 of the probe 11 to provide distance-spanning electrical interconnection to circuitry of the corrosion ratemeter shown in the left hand portion of the drawing. More particularly, the cable 24 contains electrical conductors 26, 27, 28 and 29 interconnected to position 1 of a multiposition terminal strip in switching assembly 31. The electrodes 21, 22 and 23 are connected to conductors 26, 27 and 28 respectively. In addition, the conductor 29 also connects to the electrode 21 to provide a separate current path to the circuit ground, or common (com), terminal of the circuitry of the corrosion ratemeter.

Preferably, the electrodes 21, 22 and 23 are structurally identical for purposes of the present electro-chemical technique. For purposes of the present description, the electrodes 21, 22 and 23 provide "test," "reference," and "auxiliary" or "third electrode" functions respectively. The electrode 21 for the precise determination of corrosion rate of a certain steel, should be made of this certain steel. Although the electrodes will usually be metallic, they can be formed of any substance capable of placing ions into solution in a corrodent. It will be apparent that the probe 11 may carry any number of electrodes which by proper switching and electrical connections provide the necessary functions for carrying out the measurement of corrosion rate.

Switching assembly 31 may be of any suitable form. Preferably, it is a multi-pole, multi-position switch actuated by a stepping relay, or other actuator, indicated by dashed line 32. The probe 11 is electrically interconnected in the switching assembly 31 to one set of terminals at position 1. Moveable contacts interconnect selectively the several terminal positions to external circuit terminals designated "R," "T," "com" and "A." Other probes may be connected to one or more of the remaining terminal positions 2, 3 or 4 on the switching assembly 31. A standardizing device, commonly called a "Meter Prover" is shown connected in terminal position 2 of the switching assembly 31. The Meter Prover is a resistance network representing the electrical function of the probe 11 when corrosion occurs at the test (mild steel) electrode 21 at 10 mils per year (MPY). Switching assembly 31 can be actuated by any suitable device but preferably is integrated into the other switching functions of the corrosion ratemeter by a timer-switch controller 33. The controller 33 may be of any suitable form such as a clock or timer driven rotary switch adapted to produce simultaneously, or in succession, a plurality of switch actuating functions, such as closing or opening relays, or mechanically opening or closing switch contacts in the circuitry shown in the drawing. It will be apparent that the switching functions provided by the controller 33 may be arranged readily in any desired sequence and sequence duration by one skilled in the art.

Referring now specifically to the circuitry connected to the switching assembly 31, the corrosion ratemeter of the present invention includes electrodes 21, 22 and 23 on probe 11 interconnected through the conductors 26 through 29. The conductors 26 through 29 interconnect through the switching assembly 31 to terminals R, T, A and the common current return (com) of the circuitry. The circuitry includes an isolation amplifier 36 with an input circuit connected in a voltage loop between the test electrode 21 and the reference electrode 22. The isolation amplifier 36 is an operational amplifier arranged with a high common mode of rejection so as to have a high-impedance, input circuit for isolating the electrodes 21 and 22 from the remainder of the circuitry. Preferably, a differential input operation amplifier with a voltage gain of about 250,000 is used for the amplifier 36. In this case, the amplifier 36 has first and second inputs 37 and 38 connected, respectively, to the terminals R and T.

A capacitor 39 is connected in series in the input circuit, with the input 37. More particularly, the capacitor 39 is preferably a high-quality polystyrene-type capacitor providing substantially infinite impedance between the inputs 37 and 38 of the amplifier 36. The capacitor 39 should be capable of storing electrical charges for relatively long measurement periods of time without unacceptable degradation due to noise or dissipation of electrical charges. Under such circumstances, only a change in voltage (AC) will appear in the input circuit of the amplifier 36. No direct currents, or other long term changes would appear as voltage signals in the input circuit for the purposes of the operation of the amplifier 36. As a result of the high impedance of the input circuit to amplifier 36, voltages appearing between the electrodes 21 and 22 would also appear and be stored within the capacitor 39. Thus, the capacitor 39 serves as a "memory" for voltage signals in the input circuit. The amplifier connects to a source of operating current through the terminals "B+", "com" and "B—". Additionally, a trimming potentiometer 46 may be used so that static operating conditions of the amplifier are set at a no input signal level. The amplifier 36 has an output 41 which is connected in an output circuit through a current controlling resistor 42 and to a single-pole double-throw switch 43. A by-pass capacitor 40 connects output 41 to terminal A for frequency control of the output circuit. The switch 43 is shown in the "operate" condition, i.e., the upper position. The lower position of the switch 43 is the "null" condition. In the "null," the output circuit is applied through switch 43 and a high-impedance resistor 44 to the input 37 of the amplifier 36. The amplifier supplies a small but discrete amount of output current signal to bring the inputs 37 and 38 to a zero differential voltage condition. At this time, the capacitor 39, due to the infinite impedance characteristics of the input circuit, stores a potential equal to the potential existing between the electrodes 21 and 22. More particularly, the potential during "null" condition between the electrodes 21 and 22 may be termed a freely corroding potential between these electrodes without external current flow between them. Under these circumstances, the output current signal from the amplifier 36 is substantially zero and the differential potential between the input 37 and 38 is likewise zero.

After the amplifier 36 has been "nulled," the switch 43 is placed in the upper or operate position. Now, the output circuit from the amplifier 36 is connected to the electrode 23. The amplifier 36, in response to an input signal, produces an output current signal passing between the electrodes 23 and 22 and thence through the common current return conductor 29 (com) and a conductor 47 to the common terminal of the direct current source. The direct current source for operating the ampilfier 36 may be any suitable source such as a power supply 48 connected with corresponding terminals "B+," "com," and "B—" in the circuitry. In the present embodiment of the corrosion ratemeter, a special current return to the common terminal of the power supply is provided. However, the conductor 47 may be passed directly through a resistance to the common terminal of the power supply 48 to complete the output current circuit of the amplifier 36. With this arrangement, the output current signal is representative of the voltage signal between the inputs 37 and 38 of amplifier 36.

A reference voltage signal $V_r$, is provided from conductor 49 to input 37. The reference voltage signal passes through a current limiting resistor 51, a single-pole, doublethrow switch 52 (in the upper or operate position), and then an RC network comprised of high-impedance resistor 53 and reference capacitor 54 to the input 37 of the amplifier 36. The switch 52 is the lower or null position provides a separate "null" function which will be hereinafter discussed. The switches 43 and 52 may be ganged together as indicated by the chain-like and may be operated from the timer switch controller 33, if desired. The reference voltage signal application is given a time constant function by the RC network of resistor 53 and capacitor 54. The capacitor 54 may be of the same type as the capacitor 39 with ratios of capacitance from about one to twenty and from about one to one thousand.

At the input 37, the reference voltage signal is of the particular magnitude of the polarization potential desired to be created between the electrodes 21 and 22 under controlled current operation in amplifier 36. This polarization potential will usually be in the range of from about 5 to about 25 millivolts, but preferably it is about 10 millivolts. For example, the reference voltage signal applied from conductor 49 has a magnitude on transfer through the RC network causing a 10 millivolt reference signal to be applied on the input 37 to the amplifier 36. As a result, the amplifier 36 produces an output current signal from its output 41 through the switch 43 and between the electrodes 23 and 21 so that a 10 millivolt polarization is produced at the electrode 21. This 10 millivolt polarization appears at the input 38 of the amplifier 36 and the differential potential between the inputs 37 and 38 is again zero. However, a finite output current signal exists in output 41 of the amplifier 36 which has produced this certain polarization potential. The magnitude of this current signal is representative of the corrosion rate appearing at the test electrode 22.

The magnitude of the output current signal from the output 41 of the amplifier 36 may be measured by any suitable means for the desired readout. For example, the output current signal is carried in the conductor 28, the terminal "com" and conductor 47 of the circuitry. The current signal in the conductor 47 passes to the conductor 50 through a switch 56 which selectively interconnects with a plurality of resistors 57, 58 and 59 to "set" the MPY (mils per year) range of the readout means associated with this current measurement. A capacitor 61 in-shunt across the ranging resistances may be used to dampen switching voltage peaks. The output current signal then passes to the summing point 62, a calibrating resistor 63 and voltmeter 64 on returning to the common current return conductor 66 of the power supply 48. A capacitor 60 is in-shunt with the voltmeter 64. The resistor 63 produces the conversion of current-to-voltage to be read on the voltmeter 64 and may be calibrated to provide a direct reading of corrosion rate as MPY relative to the current flowing in the conductor 47. If desired, other means of measuring this output current signal may be employed. For example, one other means may be an operational amplifier 67 having a first input 68 connected through a current limiting resistor 69 to conductor 50, and a second input 71 connected through a feedback resistor 72 connected to the output of amplifier 67 through a loading resistor 73. The output signal from the amplifier 67 is passed through conductor 74 to one terminal of a suitable recorder 70. The other terminal of the recorder 70 is connected through the common return line of the power supply 48 which is the conductor 66. The amplifier 67 may be a high-common mode rejection differential input amplifier with the usual frequency limiting capacitor and resistor network 76.

In summary, the circuitry operates in the following manner with the switches 43 and 52 in the "null" position. The amplifier 36 provides a small amount of current which results in the storage in capacitor 39 of the freely corroding potential which exists between the electrodes 21 and 22. The switch 52 short-circuits the RC network of resistor 53 and condensor 54 across the capacitor 39. As a result, the capacitor 54 stores a potential charge relative to the charge being stored in the capacitor 39. However, it is desired that the "reference" capacitor 54 be of a relatively small value compared to the "memory" capacitor 39. For example, the capacitor 39 may have a value of 5 microfarads whereas the capacitor 54 may have a value of .01 microfarad. Under these circumstances the charge stored in the capacitor 54 will be 1/500th that of the charge stored in the capacitor 39. Also, the ratio of voltage changes between capacitors 39 and 54 is 1 to 500. A change in reference voltage of 5 volts produces a 10 millivolt change in the capacitor 39.

Movement of the switches to the "operate" position applies a reference voltage signal from the conductor 49 through an RC network of resistor 53 and capacitor 54 to the input 37. The application of the reference voltage signal causes current to flow from capacitor 54 into capacitor 39. This reference voltage signal causes the amplifier 36 to produce an output current signal of sufficient magnitude between the electrodes 23 and 21 to cause the electrode 21 to be polarized to a certain desired polarization potential, for example 10 millivolts. This polarization potential appears at the input 38 of the amplifier 36 and results in a zero differential input signal between the inputs 37 and 38. As a result, the current output signal from the amplifier 36 reaches a steady-state value for practical purposes. This output current signal is correlated to the corrosion rate occurring at the test electrode 21. The magnitude of this output current signal is taken through the conductors 47 and 50, and converted to a readout by the voltmeter 46 or recorder 70.

The reference voltage signal from the conductor 49 may be provided by any suitable source. For example, with the values of 5 and .01 microfarads for capacitors 39 and 54, a 10 mv. reference signal at the input 37 would be provided by a 5 volt reference signal applied on the conductor 49. However, the total reference voltage signal should not appear instantaneously at the input 37. The reference voltage signal is given a time-constant function by the RC network of resistor 53 and capacitor 54. The time constant may have a suitable value (e.g., 5 sec.) whereby the output current signal from the amplifier 36 does not increase so suddenly as to cause sudden film-disruptive current flows at the electrode 21. In addition, the reference voltage signal on the conductor 49 may be controlled in such manner as to limit the rate of change and ultimate magnitude of the current in the output circuit of the amplifier 36.

Whatever the source of reference voltage signal, it is preferred that the circuitry be so arranged that the common signal line 75 which connects the resistor 53 and capacitor 54 in-shunt of capacitor 39 is maintained at, or without substantially any significant potential difference, to the common current return of conductor 66 of the power supply 48. For this purpose, the amplifier 77, which may be provided by any operational amplifier, is arranged to provide a slight amount of current on the conductor 66 to remove any DC potential difference between conductors 66 and 75. For this purpose, the differential input amplifier 77 has an input 81 connected to the conductor 66 and the common terminal of the power supply 48. The other input 82 is connected to the conductor 75 which is the common signal return to the electrode 22. A pair of parallel, reverse polarity connected diodes 78 and 79 are provided across the inputs 81 and 82 of the amplifier 77. The output of the amplifier 77 connects through a current controlling resistor 82 to the summing point 62 of the output circuit of the amplifier 36. In this manner, the amplifier 77 will produce a small amount of current due to any differential voltage input between inputs 81 and 82 and provides a current flow into or out of the summing point 62 until there is no DC potential differential between the inputs 81 and 82. Therefore, the conductors 75 and 66 are at the same relative DC potential. The amplifier 77, which may have a voltage gain of about 250,000, is connected to the usual sources of power as the power supply 48 at terminals "B+", "com" and "B—" and may contain a frequency limiting RC network 83. With the use of the amplifier 77, the reference voltage signal applied on the conductor 49 has as a voltage based to the common signal potential on the conductor 75 and this relationship remains whether a positive or negative voltage signal is used. A postive reference voltage signal at the input 37 produces anodic corrosion rate measurements whereas a negative reference voltage signal produces a cathodic corrosion rate measurement, the primary difference being the directional flow of the output current signal from the amplifier 36 in its output circuit.

In the present circuit, the reference voltage signal is provided by a resistance bridge network connected to the power supply 48. The bridge is connected with one arm to a source of corrective current so that the magnitude and rate of change of the reference voltage signal is controlled by the output current signal in the output circuit of the amplifier 36 flowing into the summing point 62. The current signal at summing point 62 is converted into a voltage control signal in a resistor 86 which signal is represented by $V_c$. The voltage signal $V_c$ is applied to a first input 87 of an operational amplifier 88. The amplifier 88 may be of any suitable arrangement but preferably is a differential input amplifier with a voltage gain of about 250,000. The amplifier 88 is connected to the power supply 48 through the terminals "B+," "com" and "B—" and may contain the usual frequency limiting feedback RC network 89. The output of amplifier 88 is connected through a current limiting resistor 91 into the resistor bridge network. A feedback circuit between input 87 and the output of amplifier 88 is provided by a resistor 92 in series with a capacitor 93 arranged to provide the desired frequency limiting function. The resistor network is comprised of a variable resistor 94 connected in series with resistor 96 from the output resistor 91 to the circuit common or conductor 66 and input 81 of amplifier 77. A source of voltage, which may be the power supply 48, is connected through the switch 97 at the juncture of resistors 98 and 99 which form another arm of the bridge. The remaining arm of the bridge is provided by a variable resistor 101 and fixed resistor 102 connected between resistor 99 and the common current return or conductor 66 of the circuitry.

It will be apparent that in this four arm bridge, the resistor 94 permits the precise adjustment of the reference voltage signal $V_r$ which is applied in conductor 49 to the input 37 of the amplifier 36. Adjustment of the resistor 94 provides the proper reference signal $V_r$ relative to the output current signal at the summing point 62 for the certain polarization potential between electrodes 21 and 22. Adjustment of the resistor 101 provides an internal voltage signal $kV_r$ at input 103 of the amplifier 88. The internal voltage signal $kV_r$ is arranged in consideration of the characteristics of the amplifier 88 and when the current at the summing point 62 reaches that magnitude to cause the maximum desired current flow through the probe, the amplifier 88 has a zero differential voltage between inputs 87 and 103. Therefore, the current output changes through the output resistor 91 into the bridge to reduce the reference voltage signal $V_r$. For example, for a reference voltage signal $V_r$ of 5 volts at the conductor 49, the control voltage signal $V_c$ provided by the resistor 86 to the input 87 will be at the same value as the internal control signal $kV_r$ at the input 103 of the amplifier 88. The switch 97 is moved between an upper position for anodic corrosion rate measurements, and a lower position for cathodic corrosion rate measurements. The reference voltage signal $V_r$ therefore may be positive or negative and the polarity determines the flow direction of the output current signal in the output 41 of the amplifier 36. It is usually considered that current flow from the electrode 21 towards the electrode 23 in the corrodent produces an anodic corrosion rate measurement while the reverse flow produces a cathodic corrosion rate measurement.

The reference voltage signal source operates in the following manner. The timer-switch controller 33 is adjusted to connect the circuitry to the 10 MPY prover. The switches 43 and 52 are moved first to null and then to operate positions. The MPY calibrate resistor 94 is adjusted to provide an output reading on the voltmeter 64, with range switch 56 properly adjusted, for a 10 MPY full scale reading. In the operate condition, the reference voltage signal $V_r$ is applied in the conductor 49. The rate of the reference voltage signal application on input 37 is a function of the time constant of the RC network of resistor 53 and condenser 54. The output current signal begins to increase in the conductor 47 and at the summing point 62. Simultaneously, the control voltage signal $V_c$ rises at the input 87 of the amplifier 88. If the control voltage signal $V_c$ does not reach one hundred percent value or greater than one hundred percent of the internal control signal $kV_r$, the reference voltage signal $V_r$ will increase rather rapidly since the amplifier 88 provides no correction current flow through the resistor network 98 and 99. As the control voltage $V_c$ closely approaches the internal control signal $kV_r$ the amplifier 88 produces an output current change through the resistors 98 and 99 which causes the voltage to rise in the reference voltage signal $V_r$. A rise of voltage flowing through the summing point 62 above that current flow representing the maximum allowable current setting causes the control voltage $V_c$ to rise above the value of the internal control signal $kV_r$ at input 103. The amplifier 88 will now provide suitable current change through the output resistor 91 into resistors 98 and 99 so as to reduce the magnitude of the reference voltage $V_r$ and thereby maintain the output current signal capabilities of the amplifier 36 within its design limits. The rate of change and the ultimate magnitude of the output current signal from the amplifier 36 in its output circuit and at the summing point 62 is set by the MPY limit resistor 101 which determines the signals $V_c$ and $kV_c$ applied to the inputs 87 and 103 of the amplifier 88. As long as the voltage rate of change and the resulting ultimate magnitude of current is within the preset limits, the amplifier 88 provides the control function which permits the increase of the reference voltage $V_r$ in the conductor 49 until it reaches the ultimate set limit provided by the variable resistor 94. Upon the reference voltage signal $V_r$ reaching the present value, the limiting action of the amplifier 88 ceases and the circuit will remain in operation at a steady-state output current signal condition in the conductor 47 and at the summing point 62.

With the circuitry calibrated as aforementioned with the 10 MPY Meter Prover, the timer-switch controller 33, or manual operation, moves the switch 97 to cathodic measurement and the preceding function steps are repeated. The corrosion rate measurement in the meter 64 should remain identical but in a cathodic reading. Now, the circuitry is calibrated for reading an unknown value presented at the probe 11.

The timer-switch controller 33 now adjusts the switching means 31 to connect the circuitry to the probe 11. The switches 43 and 52 are placed in a null position and within a short period of time, the freely corroding potential between electrodes 21 and 22 is stored in the capacitor 39 and the amplifier 36 is now at zero signal input. Then, the switches 43 and 52 are moved into the upper or operate condition. The circuitry functions to produce an output current signal from the amplifier 36 to produce certain polarization potential at the electrode 21. As mentioned, the certain polarization potential is a function of the reference voltage signal applied to the conductor 49. The amplifier 88 functions to regulate the rate of change and ultimate magnitude of reference voltage signal which represents the polarization potential created by the output current signal in the conductor 47, at the summing point 62 and in the conductor 66 of the power supply 48. The switch 97 may be moved from anodic to cathodic positions and both anodic and cathodic corrosion rate measurements are made. The range switch 56 may be adjusted manually to maintain the readings on the voltmeter 64 in the proper position on the substantially full scale readings for ultimate accuracy, if this is desired.

It will be apparent from the foregoing that there has been described a corrosion ratemeter which employs a "memory" capacitor in a high impedance input circuit wherein the application of a reference voltage signal does not create a significant change in the input impedance of the amplifier connected to the corrosion ratemeter probe. In addition, there are provided a novel means for providing the reference voltage signal of the input of this isolation amplifier which causes a current flow that results in the predetermined polarization to be created at the test electrode relative to the reference electrode of the probe. The reference voltage signal can be controlled so that the rate of change and ultimate magnitude of the output current signal in the output circuit from the amplifier does not exceed the current capabilities of such output circuit. Also there may be a means for removing any potential difference between the common current return to the power supply and a common signal line connected to the reference electrode at the input of the isolation amplifier.

Various changes and alterations will be apparent to those skilled in the art of the circuitry of the corrosion ratemeter of the present invention. It is intended that such changes and alterations, which do not depart from the spirit of the present invention, be included within the scope of the appended claims. The appended claims define the present invention; the foregoing description is employed for setting forth the present invention embodiments as illustrative in nature.

What is claimed is:

1. A meter for determining the rate of corrosion by means of polarization measurements in a corrodent which comprises:
   (a) a plurality of electrodes adapted to be placed into contact with a corrodent, said electrodes being a reference electrode, a test specimen electrode and a third electrode;
   (b) an isolation amplifier having an input circuit connected between said reference and test specimen electrodes, said isolation amplifier being connected to a source of direct current and providing in its output circuit connected to said test specimen and third electrodes an output current signal representative of the potential difference between said reference and test specimen electrodes;
   (c) capacitance means in series with said reference electrode in said input circuit of said isolation amplifier whereby said capacitance means are charged to the freely corroding potential representative of the potential difference present between said reference and test specimen electrodes connected to said input circuit;
   (d) means for applying a reference voltage signal to said input circuit between said capacitance means and said isolation amplifier whereby said isolation amplifier provides in its output circuit an output current signal passing between said third and test specimen electrodes for creating in the input circuit of said isolation amplifier a certain polarization potential between said reference and test specimen electrodes in addition to their freely corroding potential; and
   (e) readout means connected to said isolation amplifier to measure the output current signal representative of the polarization potential between said test specimen and reference electrodes.

2. The meter of claim 1 wherein said means for applying a reference voltage signal is adapted to produce a polarization potential between 5 and 25 millivolts between said reference and test specimen electrodes in said input circuit of said isolation amplifier.

3. The meter of claim 1 wherein switching means interconnect said means for applying a reference voltage signal to said input circuit of said isolation amplifier, and said switching means removing said reference voltage signal from said input circuit for a first period of time whereby said capacitance means are charged to said freely corroding potential and applying said reference voltage signal for a second period of time to provide a substantially steady state value of said output current signal for creating said polarization potential between said reference and test specimen electrodes.

4. The meter of claim 3 wherein said switching means apply said reference voltage through an RC network having a second capacitance means to provide a time constant function in the application of said reference voltage signal to the input circuit of said isolation amplifier for avoiding sudden film-disruptive current flows at the test electrode.

5. The meter of claim 4 wherein the ratio of the capacitances of said capacitance means and said second capacitance means in said RC network is in the range of values between about one to twenty and about one to one thousand.

6. The meter of claim 1 wherein said means for applying a reference voltage signal include a voltage limiter means for regulating the rate of change and ultimate magnitude in said reference voltage signal being applied to said input circuit to prevent the output current signal from said isolation amplifier from increasing to a magnitude greater than the current handling capabilities off said isolation amplifier.

7. A meter for determining the rate of corrosion by means of polarization measurements in a corrodent which comprises:
   (a) a plurality of electrodes adapted to be placed into contact with a corrodent, said electrodes including a test electrode formed of the metallic material to be tested, a reference electrode and a third electrode;
   (b) first differential input amplifier having first and second inputs connected in a voltage loop input circuit between said test and reference electrodes, said first differential amplifier connected to source means of direct current and providing in an output circuit connected between said test and third electrodes an output current signal representative of the potential difference between said reference and test electrodes;
   (c) capacitance means in series in said input circuit between said reference electrode and one of said inputs of said first differential amplifier whereby said capacitance means are charged to the freely corroding potential representative of the potential difference between said reference and test electrodes in said input circuit with no output current signal provided in said output circuit between said test and third electrodes representative of said freely corroding potential between said reference and test electrodes;

(d) means for applying a reference voltage signal to said input connected to said reference electrode for providing in said output circuit an output current signal having a magnitude sufficient to create in the input circuit of a certain polarization potential between said reference and test electrodes in addition to the freely corroding potential therebetween; and (e) readout means connected to said output circuit to measure the output current signal representative of the polarization potential between said reference and test electrodes.

8. The meter of claim 7 wherein said means for applying a reference voltage signal produce a polarization potential between 5 and 25 millivolts between said reference and test electrodes in said input circuit of said amplifier.

9. The meter of claim 7 wherein switching means interconnect said means for applying a reference voltage signal to said input circuit of said amplifier, and said switching means removing said reference voltage signal from said input circuit for a first period of time whereby said capacitance means are charged to said freely corroding potential and applying said reference voltage signal for a second period of time to provide a substantially steady state value of said output current signal for creating said polarization potential between said test and reference electrodes.

10. The meter of claim 9 wherein said switching means apply a reference voltage through a RC network having a second capacitance means to provide a time constant function to the application of said reference voltage signal to the input circuit of said first differential amplifier for avoiding sudden film-disruptive current flows at said test electrode.

11. The meter of claim 7 wherein said means for applying a reference voltage signal include a voltage limiter means for regulating the rate of change and ultimate magnitude in said reference voltage signal being applied to said input connected to said reference electrode of said first differential amplifier to prevent the output current signal from said source means of direct current from increasing to a magnitude greater than the current handling capabilities of said first differential amplifier.

12. The meter of claim 11 wherein said output circuit of said first differential input amplifier includes a current return circuit from said test electrode, said current return circuit comprising a second differential input amplifier having a first input connected to a common current line of said current source means and a second input connected to said reference electrode and an output connected to said test electrode, said second differential amplifier with no reference voltage signal applied to said first differential amplifier providing a small current signal in said output circuit sufficient to remove any voltage differential between said first and second inputs of said second differential amplifier, and said second differential amplifier with said reference voltage signal applied to said first differential amplifier providing for the return flow of said output current signal to said current source means.

13. The meter of claim 12 wherein said voltage limiter means comprises a third differential amplifier having a first input connected through a resistance to said output circuit of said second differential amplifier whereby a control voltage signal is generated responsive to said output current signal from said first differential amplifier, a second input receiving an internal voltage signal representative of said reference voltage signal and said third differential amplifier having an output driving a resistance bridge having first and second arms providing for adjusting said reference voltage signal to an exact magnitude representing said polarization potential created in the input circiut of said first differential amplifier, a third and fourth arm providing a preset reference voltage signal from a reference current source means in a resistance network and a resistance for adjusting the magnitude of the internal voltage signal representing the maximum magnitude of said output current signal from said first differential amplifier whereby increases in said output current signal from said first differential amplifier cause said control voltage signal magnitude at said first input of said third differential amplifier to reach a value equal to said internal voltage signal whereby output current provided thereafter from said third differential amplifier output flows into said third arm of said bridge in an amount sufficient to limit the rate of change of said reference voltage signal below that magnitude at which said reference voltage signal would exceed that exact magnitude representing said polarization potential in said input circuit of said first differential amplifier.

14. A meter for determining the rate of corrosion by means of polarization measurements in a corrodent which comprises:

(a) a plurality of electrodes adapted to be placed into contact with a corrodent, said electrodes including a test, reference and third electrodes;

(b) a first differential input amplifier having first and second input connected in a voltage loop input circuit between said test and reference electrodes, said first differential amplifier connected to source means of direct current and providing in an output circuit connected between said test and third electrodes an output current signal representative of the potential difference between said reference and test electrodes;

(c) capacitance means in series in said input circuit between said reference electrode and one input of said first differential amplifier whereby said capacitance means are charged to the freely corroding potential representative of the potential difference between said reference and test electrodes in said input circuit with no output current signal provided in said output circuit between said test and third electrodes representative of said freely corroding potential between said reference and test electrodes;

(d) means for applying a reference voltage signal to said input connected to said reference of said first differential amplifier for providing in said output circuit an output current signal of a magnitude sufficient to create in said input circuit a certain polarization potential between said reference and test electrodes in addition to the freely corroding potential therebetween;

(e) switching means interconnecting said means for applying a reference voltage signal to said input circuit of said first differential amplifier, said switching means applying said reference voltage signal through an RC network having a second capacitance means to provide a time constant function to the application of a reference voltage signal to said input circuit of said first differential amplifier for avoiding sudden disruptive-current flows at the test electrode, said switching means removing said reference voltage signal for a period of time whereby said capacitance means are charged to the freely corroding potential, and applying said reference voltage signal for a second period of time to provide a substantially steady-state value of said output current signal representative of said polarization potential between said electrodes;

(f) said output circuit including a current return circuit from said test electrode to said direct current source means, and said current return circuit comprising a second differential input amplifier having a first input connected to a common current line of said current source means and a second input connected to said reference electrode and said second differential amplifier having an output connected to said test electrode, said second differential amplifier with no reference voltage signal applied to said first differential amplifier providing a small current signal in said output circuit sufficient to remove any voltage differential between said first and second inputs of said second differential amplifier, and said second differential amplifier with said reference voltage signal applied to said first differential amplifier providing for the return flow of said output current signal to said current source means;

(g) said means for applying a reference voltage signal including a voltage limiting means for regulating the rate of change and ultimate magnitude in said reference voltage signal applied to said first differential amplifier, said voltage limiting means comprising a third differential amplifier having a first input connected through a resistance to said output circuit of said second differential amplifier whereby a control signal voltage is generated responsive to the output current signal from said first differential amplifier, a second input receiving an internal voltage signal representative of said reference voltage signal and said third differential amplifier having an output driving a resistance bridge having first and second arms for adjusting said reference voltage signal to an exact magnitude representing said polarization potential created in the input circuit of said first differential amplifier and fourth arms providing a preset reference voltage signal from a reference current source means in a resistance network and a resistance for adjusting the magnitude of the internal voltage signal representing the maximum magnitude of said output current signal from said first differential amplifier whereby increases in said output current signal from said first differential amplifier causes said control voltage signal at said first input of said third differential amplifier to reach a value equal to said internal voltage signal whereby output current provided thereafter from said third differential amplifier output flows into said third arm of said bridge in an amount sufficient to limit the rate of change of said reference voltage in said RC network below that magnitude at which said reference voltage signal would exceed that exact magnitude representing said polarization potential in said input circuit connected to said reference electrode of said first differential amplifier and said voltage limiting means thereby preventing an output current signal from said direct current source means increasing to a magnitude greater than the current handling capabilities of said first differential input amplifier; and (h) readout means connected to said output circuit to measure the output current signal representative of the polarization potential between said test and reference electrodes.

References Cited
UNITED STATES PATENTS

| | | | |
|---|---|---|---|
| 3,069,332 | 12/1962 | Seyl | 204—195 C |
| 3,156,631 | 11/1964 | Seyl | 204—195 C |
| 3,250,689 | 5/1966 | Seyl | 204—1 T |
| 3,406,101 | 10/1968 | Kilpatrick | 204—195 C |
| 3,616,417 | 10/1971 | Wilson | 204—195 C |

TA-HSUNG TUNG, Primary Examiner

U.S. Cl. X.R.

204—1 T; 324—71 C